United States Patent
Karlsson

(10) Patent No.: US 6,972,712 B1
(45) Date of Patent: Dec. 6, 2005

(54) NEAR ZONE DETECTION IN RADAR LEVEL GAUGE SYSTEM

(75) Inventor: Håkan Karlsson, Linköping (SE)

(73) Assignee: Saab Rosemount Tank Rader AB, Gothenberg (DE)

( * ) Notice: Subject to any disclaimer, the term of this patent is extended or adjusted under 35 U.S.C. 154(b) by 0 days.

(21) Appl. No.: 10/876,240

(22) Filed: Jun. 24, 2004

(51) Int. Cl.$^7$ .......................... G01S 7/40; G01S 13/08
(52) U.S. Cl. ...................................... 342/124; 342/174
(58) Field of Search ................................ 342/124, 135, 342/159, 173, 174, 195

(56) References Cited

U.S. PATENT DOCUMENTS

| | | | | |
|---|---|---|---|---|
| 5,841,666 A | * | 11/1998 | Perdue et al. ............... | 702/189 |
| 5,884,231 A | * | 3/1999 | Perdue et al. ................. | 702/28 |
| 5,973,637 A | | 10/1999 | Perdue et al. ............... | 342/124 |
| 6,078,280 A | * | 6/2000 | Perdue et al. ............... | 342/124 |
| 6,198,424 B1 | * | 3/2001 | Diede et al. .................. | 342/22 |
| 6,229,476 B1 | * | 5/2001 | Lutke et al. ................. | 342/124 |
| 6,249,244 B1 | * | 6/2001 | Heidecke .................... | 342/124 |
| 6,690,320 B2 | * | 2/2004 | Benway et al. ............. | 342/124 |
| 6,867,729 B2 | * | 3/2005 | Berry et al. ................. | 342/124 |
| 2003/0222654 A1 | * | 12/2003 | Furse et al. ................. | 324/543 |

* cited by examiner

Primary Examiner—John B. Sotomayor
(74) Attorney, Agent, or Firm—Westerman, Champlin & Kelly, P.A.

(57) ABSTRACT

A method for processing a time domain reflectometry (TDR) signal used to determine at least one process variable for a material in a tank, wherein said TDR signal has been generated by a radar level gauge system comprising a pulse generator, a probe extending into the tank for guiding the pulse, and a receiver for receiving said TDR signal, and wherein the TDR signal comprises at least a surface reflection pulse caused by an interface between different materials in the tank, and an interfering pulse caused by a transition between the pulse generator and the probe. The method comprises obtaining a first sampled TDR signal with an amplification such that the interfering pulse is unsaturated, determining a compensation pulse signal using a previously stored pulse shape and a current pulse position, subtracting said compensation pulse signal from the first sampled TDR signal, determining if a surface reflection occurs in a zone where said interfering pulse has a significant interfering effect on any surface reflection pulse occurring in this zone, and, if no surface reflection occurs in this zone, updating the current pulse position.

20 Claims, 7 Drawing Sheets

NEAR ZONE DETECTION IN RADAR LEVEL GAUGE SYSTEM

FIELD OF THE INVENTION

The present invention relates to radar level gauge systems, and more specifically RLG systems of the kind where a time domain reflectometry (TDR) signal is processes to determine at least one process variable for a material in the tank.

BACKGROUND OF THE INVENTION

Such RLG systems typically include a pulse generator, a probe extending into the tank for guiding the signal, and a detector for receiving said TDR signal. The TDR signal typically comprises at least a surface reflection pulse caused by an interface between different materials in the tank, typically but not necessarily a liquid surface, and an interfering pulse caused by a transition between the pulse generator and the probe.

In such RLG systems, the measurement process can be complicated or even made impossible, when the surface reflection pulse occurs in the beginning of the probe, where the influence of the interfering pulse is significant. This area of the measurement range is herein referred to as the "near zone", and can be in the range of 0 m to 0.2–0.5 m depending on the type of pulse generator used. The problem can be accentuated by the fact that the interfering pulse has an opposite sign compared to the surface reflection, and therefore will cause an attenuation or complete cancellation of the surface reflection pulse if they occur too close to each other. As a result, RLG systems may exhibit a zone immediately below the top of the tank, where measurement results can be uncertain.

Conventional RLG systems include various processing of the TDR signal, and some of these processing methods are described in U.S. Pat. No. 5,973,637. However, none of these methods are suitable for improving near zone detection.

SUMMARY OF THE INVENTION

An object of the present invention is to improve RLG systems in terms of near zone detection.

This and other objects are achieved with a method of the kind mentioned by way of introduction, comprising obtaining a first sampled TDR signal with an amplification such that the interfering pulse is unsaturated, determining a compensation pulse signal using a previously stored pulse shape, a detected pulse amplitude and a current pulse position, subtracting said compensation pulse signal from the first sampled TDR signal, determining if a surface reflection occurs in an area where said interfering pulse will have a significant interfering effect on the surface reflection pulse, and if no surface reflection occurs in this area, updating the current pulse position.

According to an embodiment of the invention, a compensating signal is subtracted from the TDR signal in order to improve the accuracy in the near zone. The compensating signal is determined using a preset pulse shape and current values for the maximum amplitude and position of the interfering pulse. When no surface reflection is determined to occur in the near zone, the position of the interfering pulse can be updated.

The compensation signal can be based on the fact that the shape of the interfering pulse is essentially constant for a given type of pulse generator. The amplitude can be influenced by the type of probe and the installation.

BRIEF DESCRIPTION OF THE DRAWINGS

The invention will now be described in more detail, with reference to the appended drawings, in exemplifying manner illustrating a preferred embodiment of the invention.

DETAILED DESCRIPTION OF THE PREFERRED EMBODIMENT

Figure 1:
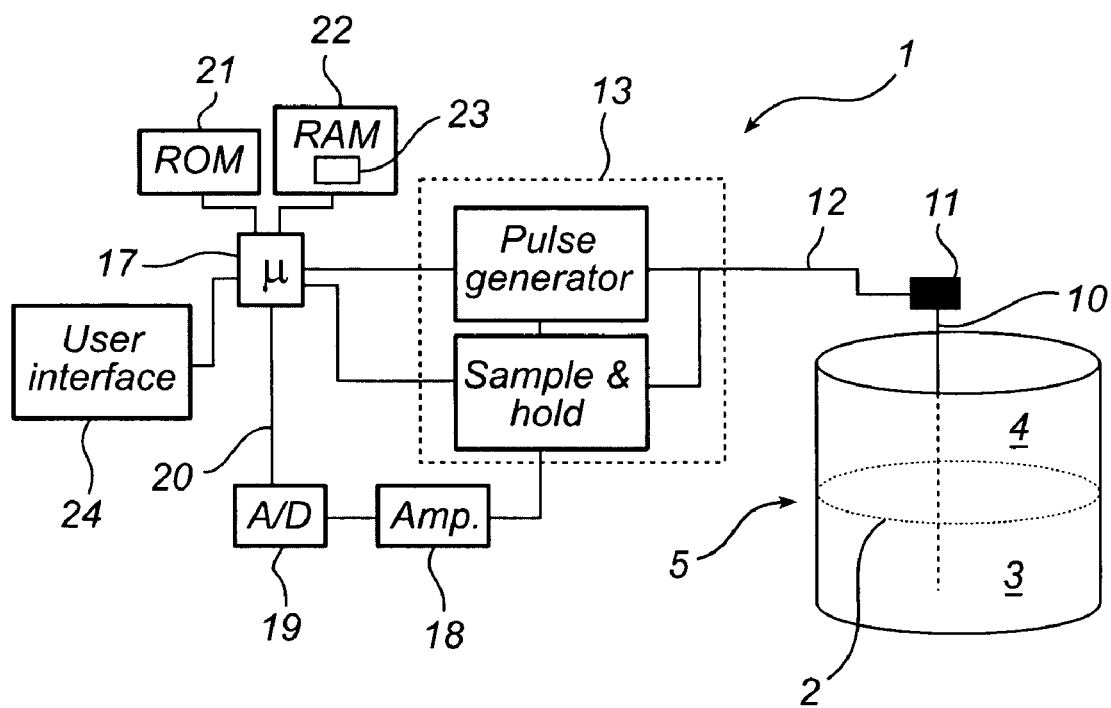
FIG. 1 schematically shows a radar level gauge system mounted on a tank.

FIG. 1 shows schematically a radar level gauge system 1 in which a method according to the invention may be advantageously used. The system 1 is arranged to perform measurements of a process variable such as the level of an interface 2 between two materials 3, 4 in a tank 5. Typically, the first material 3 is a liquid stored in the tank, e.g. gasoline, while the second material 4 is air.

The system 1 comprises a probe 10, attached to a mounting device 11 and extending into the tank 5. The probe 10 can be of any known kind, such as a coaxial or dual line probe. In the presently described case, it is a dual line transmission probe.

The mounting device 11 of the probe 10 is connected, via line 12, for example a cable or the like, to a transceiver 13, for generating a series of pulses to be transmitted by the probe 10 into the tank 5, and receiving a time domain reflectometry (TDR) signal.

The transceiver 13 comprises a pulse generator 14, preferable arranged to generate pulses with a length of about 2 ns or less, with a frequency in the order of MHz, at average power levels in the nW or $\mu$W area. The transceiver 13 also comprises a sample and hold circuit 15, connected to the pulse generator 14 and to the line 12.

The transceiver 13 is controlled by a micro processor 17, providing the pulse generator with a high frequency (e.g. 2 MHz) clock signal, and the sample and hold circuit 15 with an oscillation signal (e.g. 40 Hz). The microprocessor 17 is also, via an amplifier 18 and an A/D-converter 19, connected to an output of the sample and hold circuit 15, which provides the processor 17 with a digitalized, sampled TDR signal 20. The signal 20 is expanded in time, allowing for use of conventional hardware for conditioning and processing. The processor 17 is further connected with a ROM unit 21 (e.g. an EEPROM) for storing pre-programmed parameters, and a RAM unit 22 for storing software code 23 executable by the microprocessor 17. The processor can also be connected to a user interface 24.

Figure 2A:
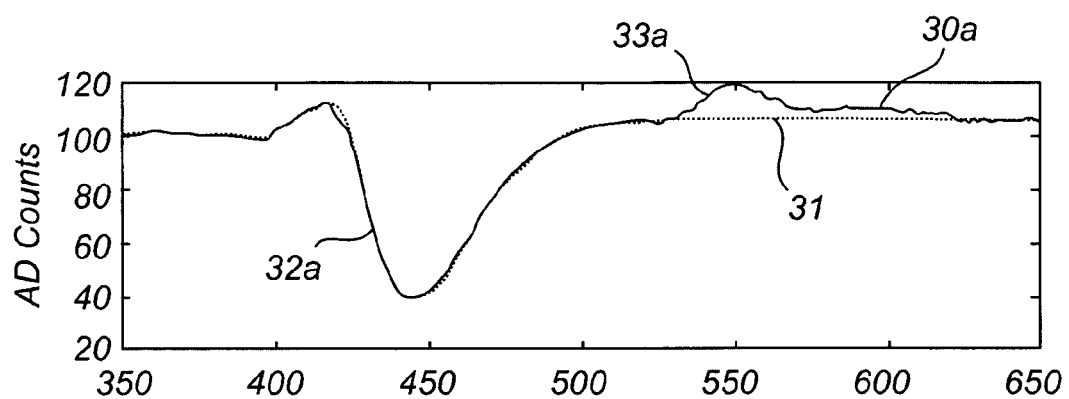
FIGS. 2a and 2b are graphs of TDR signals obtained with a conventional RLG system.
Figure 2B:
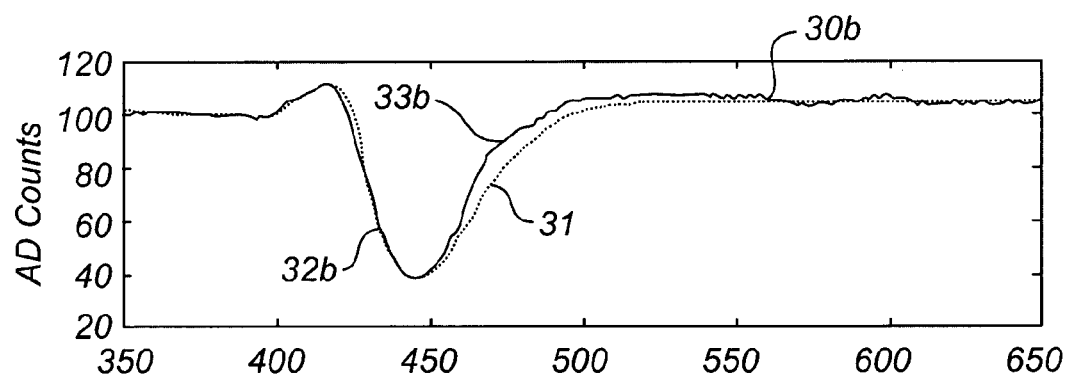

FIGS. 2a–b shows two graphical examples of a TDR signal 30a and 30b acquired with a conventional RLG system in a tank containing oil, as well as a dashed line indicating a signal 31 for an empty tank. As is clear from FIG. 2a, the signal comprises a first, negative pulse 32, and a second, positive pulse 33. The first pulse is caused by the transition from the cable 12 into the probe 10 in air. As the probe has higher impedance, the pulse is negative. The second pulse is caused by the reflection against an oil liquid. As the probe in oil has lower impedance than the probe in air, this pulse is positive. During processing, the first pulse can be used as a reference, as it defines the beginning of the probe. However, it also influences the appearance of the second pulse, especially in the illustrated situation, where the two pulses have opposite signs. Therefore, the first pulse is here referred to as an interfering pulse, while the second pulse is referred to as the surface reflection pulse.

In FIG. 2b, the oil surface is closer to the top of the tank, and the surface reflection pulse 33 thus appears closer to the interfering pulse 32. As a consequence, the surface reflection pulse does not appear distinctly, but only results in a slight elevation of the positive flank of the interfering pulse 32. This is visible in the figure when comparing the TDR signal 30 with the empty tank signal 31. The surface reflection in this case occurs somewhere close to 475.

It is clear from FIGS. 2a–b that conventional processing methods will be insufficient for determining the exact position of the surface reflection pulse, due to interference from the pulse caused by the transition between cable and probe.

Figure 3:
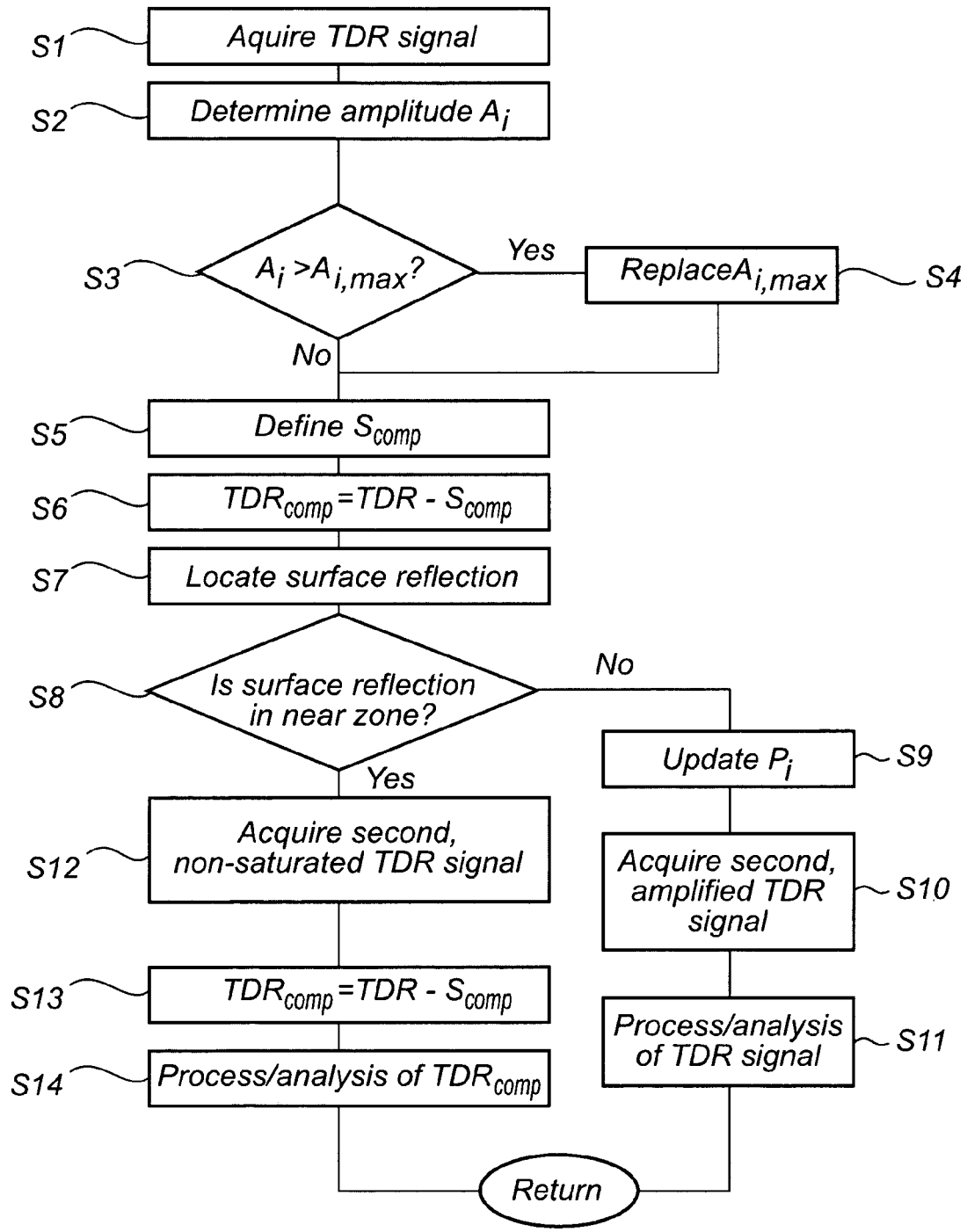
FIG. 3 is a flow chart of a method according to an embodiment of the invention.

A preferred embodiment of the invention is illustrated in the flow chart in FIG. 3. The process described by the flow chart can be realized by a computer program comprised in the program code 23 and running on the processor 17. This control program can thus control the pulse generator 14, the sample and hold circuit 15, the amplifier 18, and any other components of the system required to perform the described method.

In this particular embodiment, two sampled TDR signals are obtained for each measuring, a first sampled signal is obtained by the sample and hold circuit 15, and amplified by amplifier 18 such that the interfering pulse is not saturated. This is suitable for obtaining information about this pulse, enabling use of it as a reference pulse during the future processing and analysis of the TDR signal. Then, a second sampled signal is obtained and amplified using more powerful amplification. This is suitable for ensuring that the surface reflection pulse, which in some situations, depending on materials in the tank and other conditions, can be very weak, is more easily detectable. The principle of a two-part sampling process is not novel, and the invention is by no means limited to the use of such a process.

Returning top FIG. 3, a first, non-saturated sampled TDR signal is obtained in step S1. This first signal does not necessarily cover the entire range of the tank, but preferably only the beginning of the probe. As mentioned, its primary purpose is to gain information about the interfering pulse.

According to this particular embodiment, the amplitude of the interfering pulse $A_i$ is then determined in step S2, and in step S3 compared to an amplitude value currently stored in the RAM 22. If the detected amplitude is greater than the previously stored value, this stored value is replaced with the detected amplitude in step S4, before the program control moves on to step S5.

In step S5, the processor 17 defines a compensation signal based on a pulse shape previously stored in the ROM 21, and a current pulse position, $P_i$, also stored in the RAM 22. The current pulse position $P_i$ in the RAM 22 corresponds to the anticipated position of the extreme point of the interfering pulse 32, and the compensation signal is aligned so that its extreme point coincides with the current pulse position $P_i$. If required, the compensation signal can also be rescaled in order to correspond to the amplitude of the interfering pulse, in the illustrated case using the detected amplitude value $A_i$.

As the pulse amplitude can vary significantly depending on the probe and installation, it can be advantageous to secure a detection of the interfering pulse amplitude before step S5, here in step S2. This means that the amplitude is measured every sampling. If it could be ascertained that no surface reflection was present in the near zone during this detection, one single detection would be sufficient, as the amplitude is essentially unaffected by ambient conditions. However, to handle the case when a surface reflection is present in the near zone during startup (when the first sampling is made), thus reducing the detected amplitude of the interfering pulse, the steps S3 and S4 will allow for a gradual increase of the stored amplitude value. Therefore, when the surface reflection pulse moves out of the near zone, and the detected amplitude of the interfering pulse increases, the stored value will also increase. Basically, as soon as it has been ascertained that the amplitude of the interfering pulse has been detected without disturbance from any surface reflection, no additional detections are required. If considered advantageous, such a routine could be implemented in the program.

The pulse shape stored in ROM 21 can be determined and stored during pre-installation calibration, or be set to a fixed curve if the expected variations are minor. It has been found that the curve shape typically only differs in terms of amplitude when comparing different types of probes, such as a twin rigid probe and a coaxial probe. Therefore, it can be sufficient to store a curve corresponding to the pulse generator to be used, or possibly several different curves in case the system can be used with different signal boards having different pulse generators. Further, installation dependent adjustments of this shape may also be stored in a user area of the ROM 21, by providing suitable options in the user interface 24.

Figure 4A:
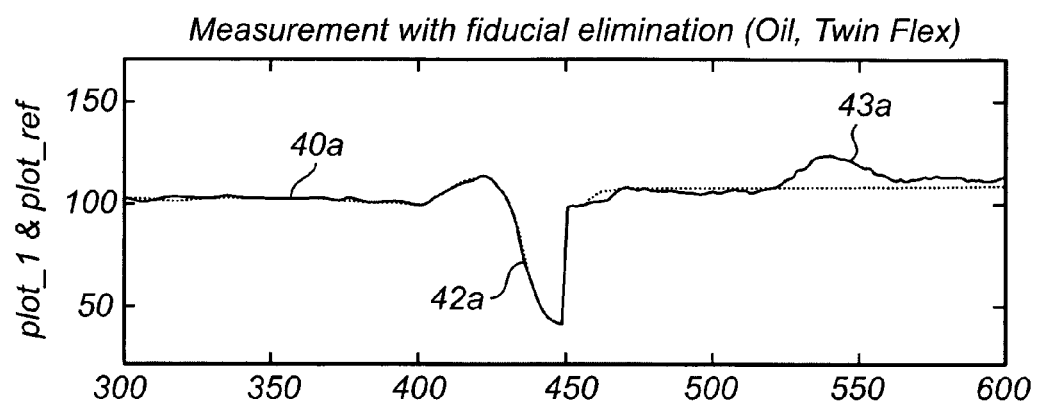
FIGS. 4a and 4b are graphs of TDR signals compensated according to the method in FIG. 3.
Figure 4B:
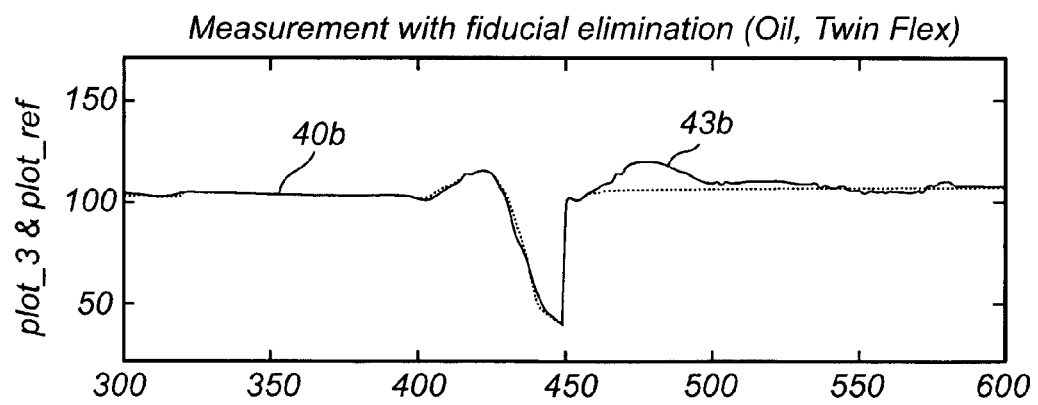

In step S6, the processor subtracts the compensation signal from the detected TDR signal, resulting in a compensated TDR signal 40 (see FIGS. 4a–b).

In step S7 the position of any surface reflection pulse is determined by processor 17, using conventional techniques for TDR signal processing. Such techniques may include threshold analysis, derivative analysis, etc.

The purpose of the subtraction in step S6 is to remove any influence from the interfering pulse from the TDR signal, in order to enable a more secure localization of the surface reflection pulse. As the surface reflection by definition occurs during the time range after the extreme point of the interfering pulse, $P_i$, computational power can be saved by only defining the compensation signal for this time range.

FIGS. 4a–b show two graphical examples of compensated TDR signals 40a and 40b, essentially corresponding to the signals 30a and 30b in FIG. 2. Note however, that the position of the surface reflections are slightly offset. From the curves it is clear that the compensation signal has been subtracted starting from the extreme point, $P_i$.

In FIG. 4a, the surface reflection pulse 43a is probably far enough from the interfering pulse 42a to be detectable even without the compensation in step S6.

In FIG. 4b, the situation is similar to that in FIG. 2b, where the surface reflection is less apparent and more difficult to detect due to interference from the interfering pulse. In FIG. 4b, however, the subtraction of the compensation signal has removed the influence from the interfering pulse, and the surface reflection 43b is clearly visible, and thus easy to detect correctly.

Returning now to the flow chart in FIG. 3, in step S8, it is determined if any surface reflection pulse is present in the near zone. In order to make this determination, a quantitative definition of the near zone in terms of time distance from the extreme point Pi must be defined, and stored in the RAM 22 or ROM 21. This definition should be based on characteristics of the probe and tank, and preferably be such that it includes the entire area in which the influence of the interfering pulse is significant. Typically, this is the case until the interfering pulse has declined to a defined percentage of its maximum amplitude, for example about 5%, preferably only about 3%, and most preferably only about 1%. This position where the interfering pulse has declined to this predefined level thus indicates the beginning of the near zone.

If no surface reflection is present in the near zone (like in FIG. 2a), the interfering pulse 32a can be considered to be unaffected by the surface echo, and the TDR signal 30a can in step S9 be analyzed in order to update the current pulse position $P_i$, stored in the RAM 22. The details of this updating process will be described in more detail below.

Then, in step S10, a second, more amplified sampled TDR signal is acquired, and any desired information is extracted by processing and analyzing this signal in step S11. It may be advantageous to perform a compensation also of the second TDR signal, but as the surface reflection has been located outside the near zone, this may not be required. After the analysis of the TDR signal has been completed, or possibly even before this, program control returns to step S1 to acquire a new sampled TDR signal.

If a surface reflection is found to be present in the near zone in step S8, no update of the pulse position $P_i$ will be made. However, if, as in the present example, the first sampling in step S1 was only of a portion of the measurement range, a second sampled TDR signal, having a greater range than the first TDR signal, is acquired in step S12. Just like the first TDR signal, this second TDR signal is acquired with an amplification such that the interfering pulse is non-saturated. Note that, if instead a TDR signal covering the entire range was acquired already in step S1, no second TDR signal would be required at this stage.

Then, in step S13, the subtraction performed in step S6 is again performed, in order to obtain a compensated TDR signal, covering the entire measuring range. This signal is processed and analyzed in step S14 to extract any desired information from the TDR signal.

Note that the processing steps S11 and S14 are essentially equivalent, the only difference being that the TDR signals to be analyzed have different amplification. Also, the TDR signal analyzed in step S14 has been compensated in step S13, while the TDR signal analyzed in step S11 may be uncompensated.

Figure 5:
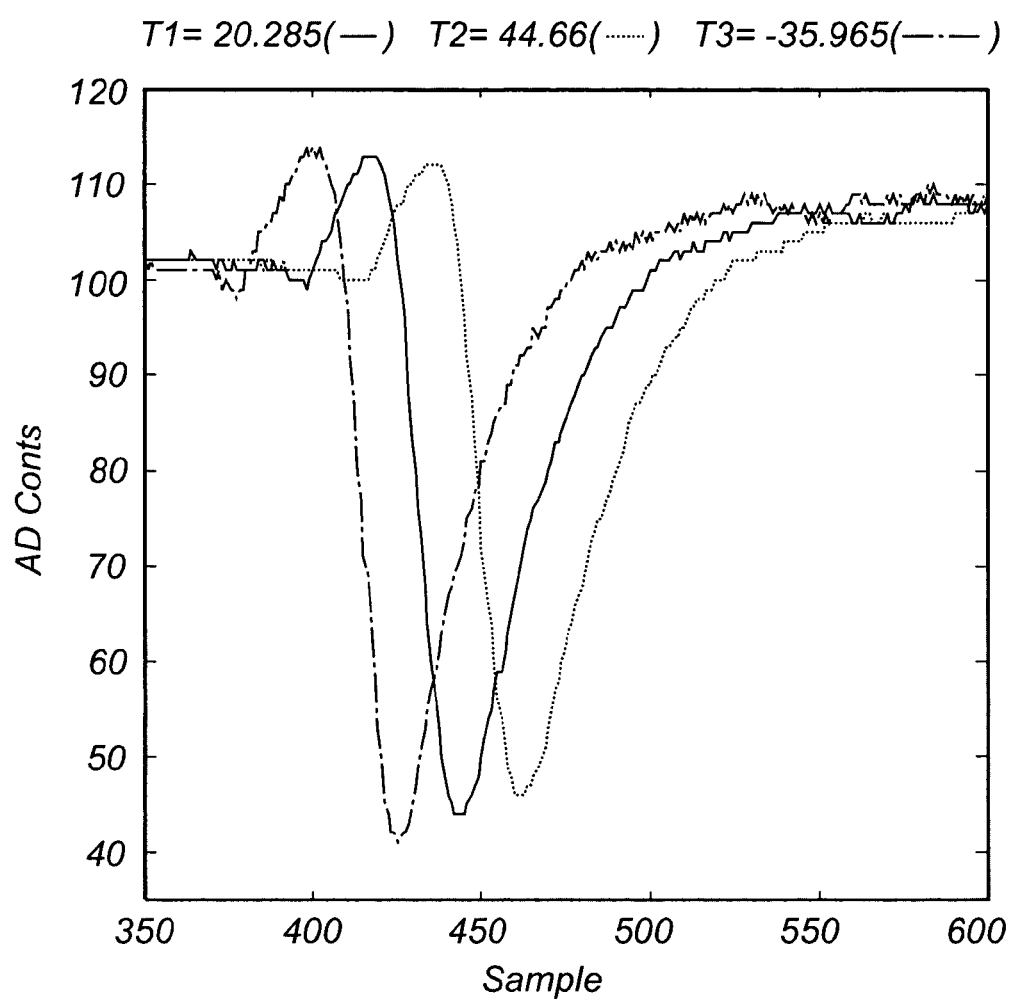
FIG. 5 is a graph illustrating the influence of temperature on the position of the interfering pulse.

As illustrated, the described method allows a better determination of a surface reflection pulse in the near zone, by subtracting a compensation signal based on information about the interfering pulse from the TDR signal. However, while the amplitude of the interfering pulse is essentially unaffected by ambient conditions, the position of the interfering pulse may change. The influence of temperature is illustrated in FIG. 5, from which it is clear that the amplitude of the pulse is almost constant, while the position changes. As described above, the current position of the interfering pulse is therefore updated in S9 each time the surface reflection is determined to be outside the near zone, i.e. when the interfering pulse is uninfluenced by any surface reflection. In one embodiment of this updating process, the step S9 quite simply includes determining the extreme point of the interfering pulse, using known methods of TDR signal analysis.

However, during periods when a surface reflection is present in the near zone, the extreme point of the interfering pulse is influenced by the surface reflection. Therefore, in a more elaborate embodiment, the pulse position $P_i$ is divided into a first part which is relatively unaffected by a surface reflection in the near zone, and a second part which is more affected by a surface reflection in the near zone. Consequently, the first part can be updated each time the first sampled TDR signal is acquired, while the second part is only updated if no surface reflection is present in the near zone. This division of the position $P_i$ can provide a more precise determination of the position of the interfering pulse, even during periods when a surface reflection is present in the near zone.

Figure 6A:
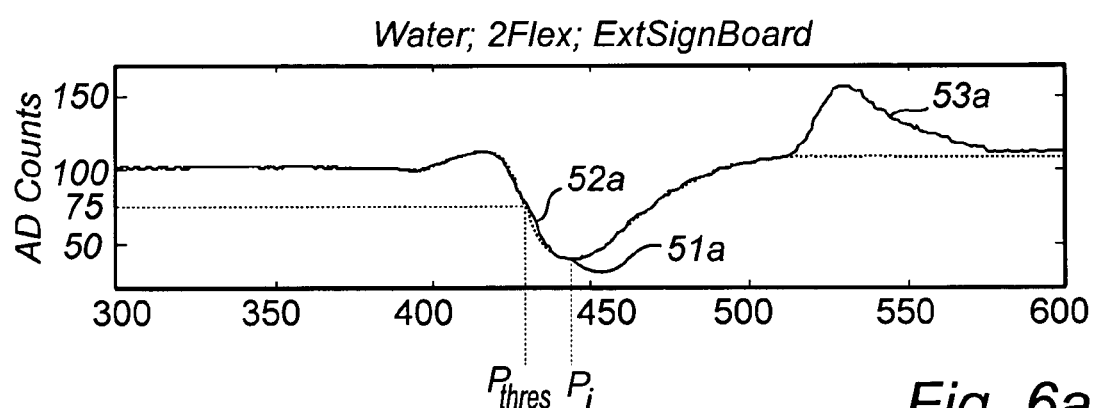
FIGS. 6a–b are graphs of an interfering pulse influenced by a surface reflection in the near zone.
Figure 6B:
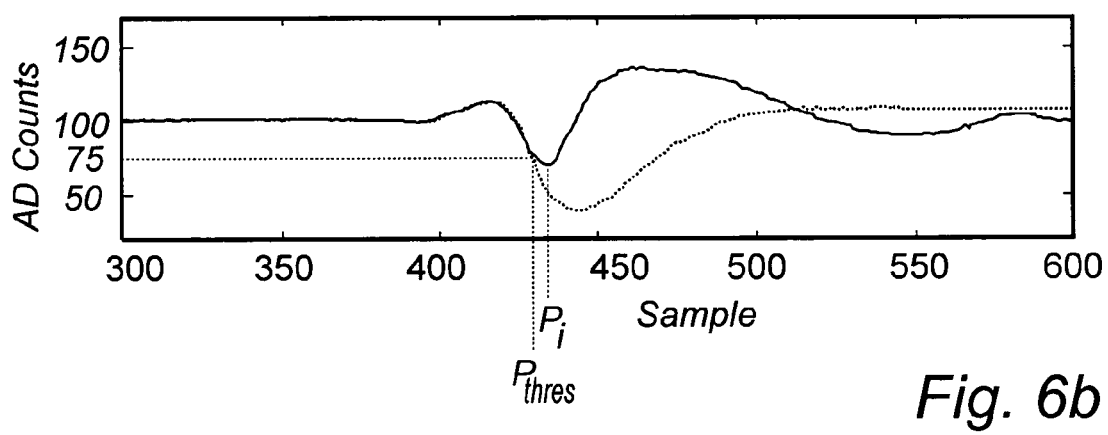

FIGS. 6a–b show a section of a TDR signal close to the interfering pulse. In FIG. 6a, no surface reflection is present in the near zone, while in FIG. 6b, a surface reflection is in the near zone close to the top of the tank. It is clear from the figures that the position of the extreme point 51a, 51b of the interfering pulse 52a, 52b is significantly affected by the surface reflection pulse 53a, 53b. However, it has been established by the inventor that the position $P_{thres}$ at which the negative slope of the interfering pulse crosses a given threshold is essentially unaffected by the surface reflection. This threshold can be expressed as a percentage of the maximum pulse amplitude, and in the illustrated example it is 30% of the maximum amplitude. Note that the pulse is negative, and so the amplitude is calculated from the DC level and down. The threshold is thus 30% of the amplitude below the DC level. As this position $P_{thres}$ is uninfluenced by ambient conditions, it can thus be used as the part of the pulse position $P_i$ not affected by the surface reflection pulse.

The distance from the threshold crossing $P_{thres}$ to the actual extreme point of the interfering pulse will however be affected by the surface reflection pulse. Therefore, this distance should only be determined when it has been determined that the surface reflection is not present in the near zone (i.e. in step S9 in FIG. 3). Determining this distance is simply done by determining the actual position of the extreme point $P_i$ using conventional TDR signal analysis, and then subtraction the current value of the threshold crossing $P_{thres}$.

Figure 7:
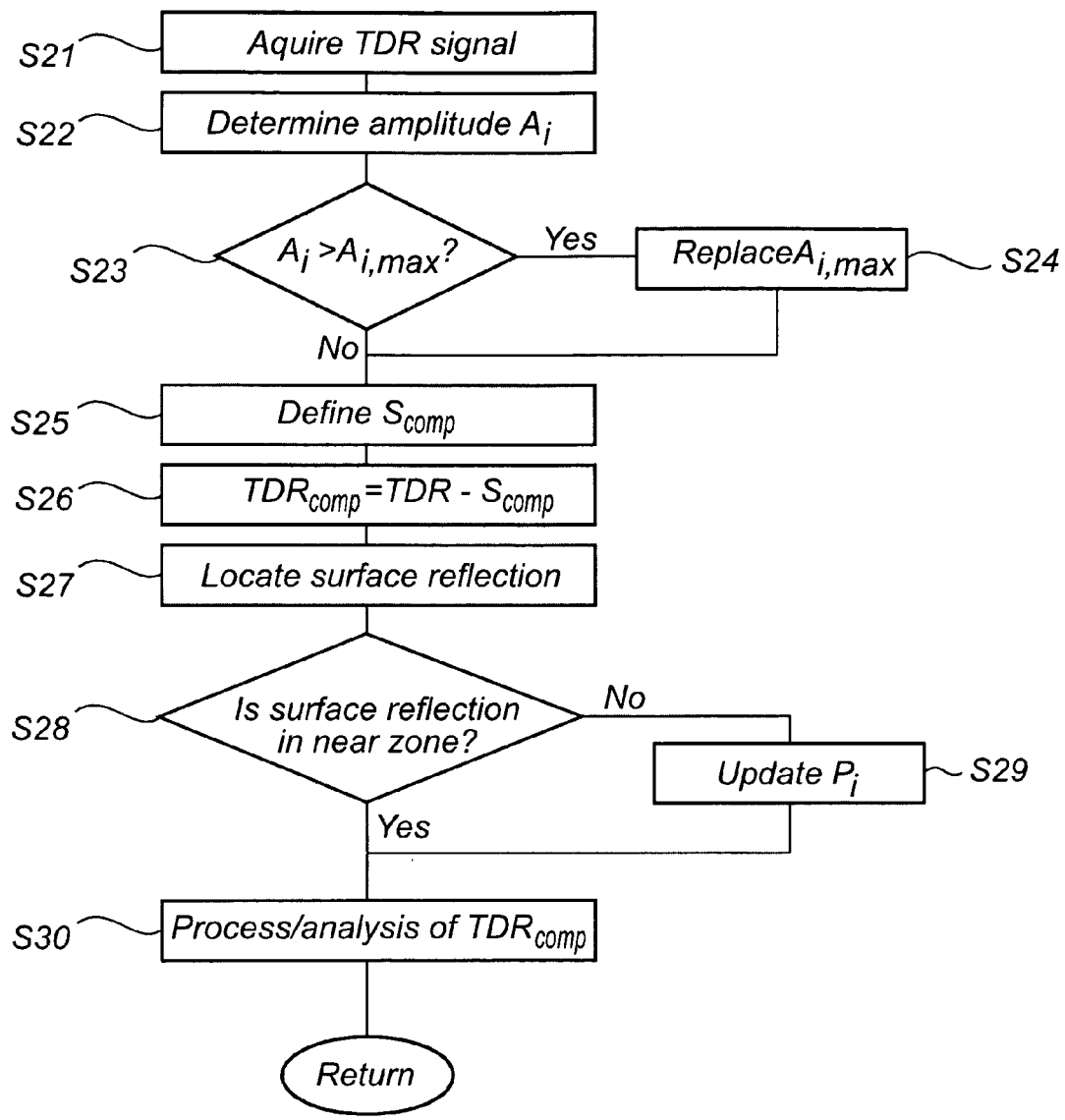
FIG. 7 is a flow chart of a method according to a further embodiment of the invention.

In an alternative embodiment, illustrated in the flow chart in FIG. 7, employs a single sample measuring process. FIG. 7 includes the steps S21–S29, corresponding to the steps S1–S9 in FIG. 3.

In this case, the first acquired TDR signal preferably includes the entire measurement range, as no second sampling is made. If no surface reflection is found present in the near zone in step S28, program control continues to step S30, where any additional TDR signal analysis is performed, before returning to step S21. If a surface reflection is found to be present in the near zone in step S28, the position of the extreme point, Pi, is updated, before program control continues to step S30.

It is clear to the skilled person that only the presently preferred embodiments of the invention has been described. Several variations and modifications are possible within the scope of the appended claims. For example, slight modifications of the described method may be advantageous when adopting it to a RLG system having a different electronic design. Also, the method can naturally include additional steps and routines, not described herein.

Further, the method has been described only with reference to probe based RLG, while it may also be used to improve the performance of free propagating RLG, i.e. systems where the pulses are transmitted into the tank without a probe. In such a system, the interfering pulse is caused by the transition between the radar antenna and free space, and the advantages of the described method will be similar.

What is claimed is:

1. A method for processing a time domain reflectometry (TDR) signal used to determine at least one process variable for a material in a tank, wherein said TDR signal has been generated by a radar level gauge system comprising a pulse generator, a probe extending into the tank for guiding the pulse, and a receiver for receiving said TDR signal, and wherein the TDR signal comprises at least a surface reflection pulse caused by an interface between different materials in the tank, and an interfering pulse caused by a transition between the pulse generator and the probe, said method comprising:
   obtaining a first sampled TDR signal with an amplification such that the interfering pulse is unsaturated,
   determining a compensation pulse signal using a previously stored pulse shape and a current pulse position,
   subtracting said compensation pulse signal from the first sampled TDR signal,
   determining if a surface reflection occurs in a zone where said interfering pulse has a significant interfering effect on any surface reflection pulse occurring in this zone, and
   if no surface reflection occurs in this zone, updating the current pulse position.

2. The method of claim 1, wherein said zone is defined to begin where the interfering pulse has declined below a given percentage of its maximum amplitude.

3. The method of claim 2, wherein said percentage is less than 5%.

4. The method of claim 1, wherein a signal resulting from the subtraction is used to determine said process variable.

5. The method of claim 1, wherein the step of determining said compensation pulse signal further comprises scaling said pulse shape using a detected pulse amplitude.

6. The method of claim 5, further comprising:
   for each first sampled TDR signal, detecting the amplitude of the interfering pulse, determining if the detected amplitude is greater than a stored value for the pulse amplitude, and if so, replacing said stored value with said detected pulse amplitude.

7. The method of claim 1, wherein said pulse position comprises one surface reflection independent component, and one surface reflection dependent component.

8. The method of claim 7, wherein said surface reflection independent component is updated for each first sampled TDR signal.

9. The method of claim 7, wherein said surface reflection dependent component is updated only if no surface reflection is present in said area.

10. The method of claim 7, wherein said surface reflection independent component is defined as an intersection of the first sampled TDR signal with a threshold value.

11. The method of claim 10, wherein said threshold value is in the range 20–40% of the maximum pulse amplitude.

12. The method of claim 10, wherein said surface reflection dependent component is defined as a distance between said intersection and an extreme point of said interfering pulse.

13. The method of claim 1, further comprising:
   if no surface reflection is present in said zone, obtaining a second sampled TDR signal amplified in relation to said first TDR signal,
   determining a compensation pulse signal using said stored pulse shape, said current maximum pulse amplitude and the updated current pulse position, and
   subtracting said compensating pulse signal from the second sampled TDR signal.

14. The method of claim 13, wherein a signal resulting from the subtraction is used to determine said process variable.

15. The method of claim 13, wherein said second sampled TDR signal comprises a larger range than said first sampled TDR signal.

16. The method of claim 1, further comprising:
   if a surface echo is present in said zone, obtaining a second sampled TDR signal comprising a larger range than said first sampled TDR signal, and
   subtracting said compensating pulse signal from the second sampled TDR signal.

17. The method of claim 16, wherein a signal resulting from the subtraction is used to determine said process variable.

18. The moethod of claim 1, where the process variable is a level of an interface between two materials in the tank.

19. A device for processing a time domain reflectometry (TDR) signal used to determine at least one process variable for a material in a tank, comprising:
   means for generating a compensation pulse signal using a previously stored pulse shape, a current maximum pulse amplitude and a current pulse position,
   means for subtracting said compensation pulse signal from a first sampled TDR signal,
   means for determining if a surface reflection occurs in a zone where said interfering pulse will have a significant interfering effect on the surface reflection pulse, and
   means for updating the current pulse position if no surface reflection occurs in this area.

20. A radar level gauge system, comprising:
   a pulse generator, a probe extending into a tank for guiding the signal,
   a sampling device for acquiring a sampled time domain reflectometry (TDR) signal, and
   a TDR signal processing device for determining at least one process variable for a material in the tank,
   said TDR signal comprising at least a surface reflection pulse caused by an interface between different materials in the tank, and an interfering pulse caused by the transition between the signal generator and the probe,
   wherein said processing device includes:
   means for generating a compensation signal using a previously stored pulse shape, a current maximum pulse amplitude and a current pulse position,
   means for subtracting said compensation pulse signal from a first sampled TDR signal,
   means for determining if a surface reflection occurs in a zone where said interfering pulse will have a significant interfering effect on the surface reflection pulse, and
   means for updating the current pulse position if no surface reflection occurs in this area.

* * * * *